June 28, 1927.
L. D. HARNETT
RADIATOR
Filed Aug. 30, 1926
1,633,664
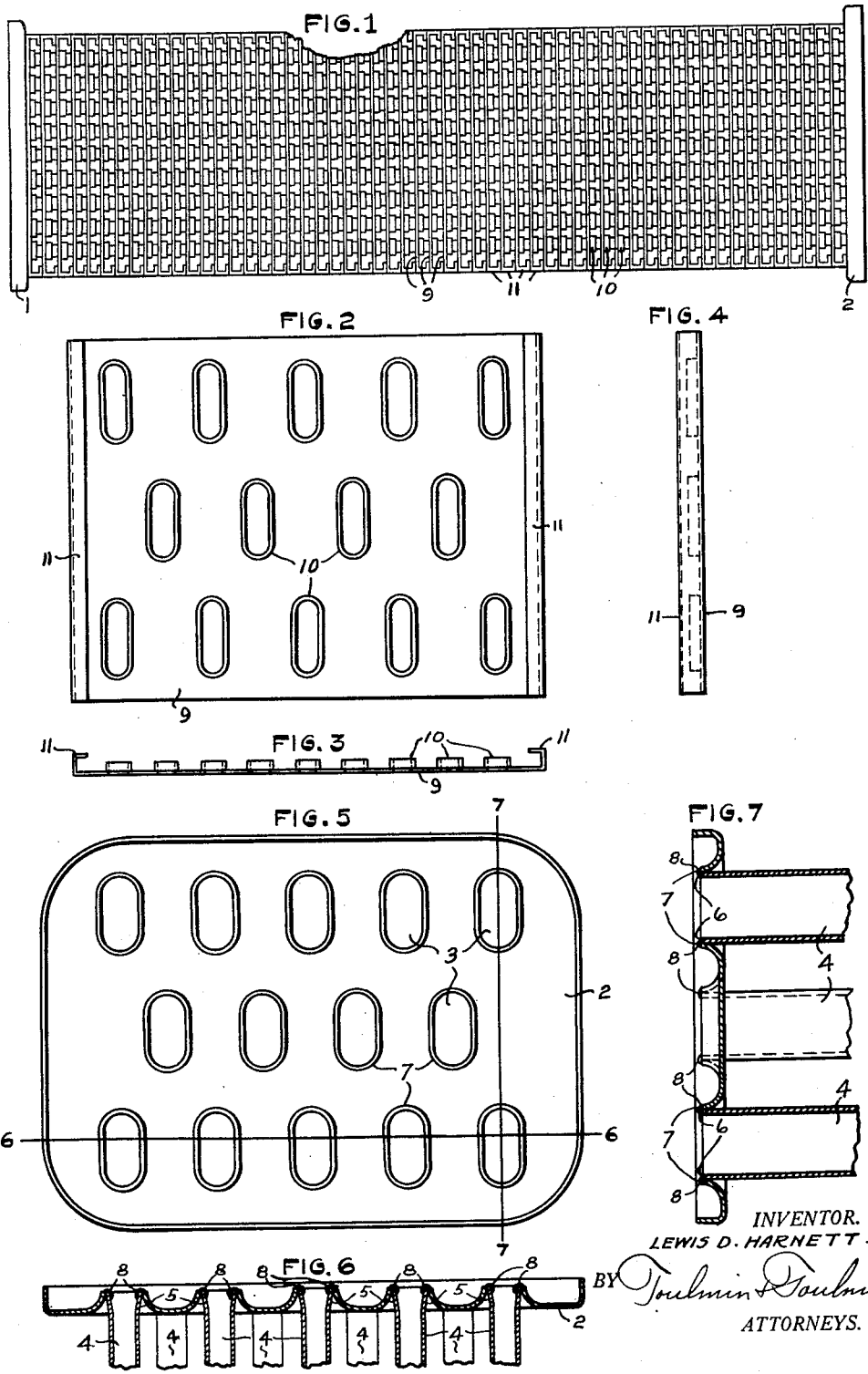
INVENTOR.
LEWIS D. HARNETT
BY Toulmin & Toulmin,
ATTORNEYS.

Patented June 28, 1927.

1,633,664

UNITED STATES PATENT OFFICE.

LEWIS D. HARNETT, OF COLUMBUS, OHIO, ASSIGNOR TO THE BUCKEYE BLOWER COMPANY, OF COLUMBUS, OHIO, A CORPORATION OF OHIO.

RADIATOR.

Application filed August 30, 1926. Serial No. 132,435.

My invention relates to radiators.

It is the object of my invention to provide a very light and very strong radiator, which will have the maximum radiating surface, which may be assembled from stampings and seamless drawn copper tubing, which may be made out of non-ferrous material and can be so arranged that freezing of the radiator will not destroy it.

My radiator is particularly adaptable to heating and ventilating units employed in buildings, such as schools, churches, hospitals, and the like.

In the accompanying drawings:

Figure 1 is a plan view of my assembled radiator;

Figure 2 is a side elevation of one of the spacing plates;

Figure 3 is a plan view thereof;

Figure 4 is an end elevation thereof;

Figure 5 is an end elevation of the header plate;

Figure 6 is a section on the line 6—6 of Figure 5, showing the method of installing the tubes in the header plate;

Figure 7 is a section on the line 7—7 of Figure 5.

Referring to the drawings in detail, 1 and 2 are the headers, which may be of drawn stock, preferably of non-ferrous material.

Each one of these cup-shaped headers is provided with a header plate on the face thereof designated 2, such plates having a plurality of openings, generally rectangular in shape, designated 3, and provided with rounded ends. These openings are substantially the same shape as the pipes 4.

The pipes 4 are expanded as at 5 to the size of the openings 3 and have their margins 6 engaging with the margins 7 of the openings to which they are welded by the welding material 8. The reason for having these openings and pipe ends larger than the main body of the pipes is that there is no restriction of the flow through the pipes due to the welding bead 8, as the space occupied thereby is less than the space necessary to maintain the normal opening through the pipe 4. Thus, the passage of steam is not impeded.

The openings 3 are staggered so that the pipes are staggered, lending strength and stability to the structure.

Strung on each one of these pipes one-quarter of an inch apart are a series of plates 9 of thin, non-ferrous material, such as copper, the tubes also being of copper, while the header plates are preferably of brass. These radiating plates 9 have a plurality of struck-up tubular flanges 10 engaging with the side walls of the tubes 4. The ends of these plates 9 are formed into spacing angle pieces 11, which abut against one another to maintain them in spaced relationship of approximately one-quarter of an inch apart. Thus, the heat is conveyed from the pipes through these plates 9 by conduction, and conveyed by the air passing over the plates by convection.

It will be seen that, due to the extremely light weight of the material employed, the radiators are very light, but, due to the structural characteristics, the tubes are thoroughly protected and the structure is very strong.

A large radiating surface is provided, thus enabling a small radiator to be utilized.

In the event that the attendant of the building in extremely cold weather neglects to close the intake opening and the radiator freezes, I find that the utilization of pipes having a narrow width and a relatively great depth permits of expansion of the pipes laterally to take care of freezing conditions, so that it is practically impossible to burst these pipes and wreck the radiator due to freezing.

The pipes are further re-inforced by the transverse plates 9, which support the pipes and take up the stresses and strains incidental to such conditions.

It will be understood that I desire to comprehend within my invention such modifications as may be necessary to adapt it to varying conditions and uses.

Having thus fully described my invention, what I claim as new and desire to secure by Letters Patent, is:—

In combination, headers, a plurality of pipe members connected to said headers having flat sides and rounded ends, the distance between said sides being materially less than the distance between said ends, and a series of plates having sleeves thereon adapted to fit over said pipes, and means on the ends of said plates formed at right angles thereto having inwardly turned ends, said ends engaging with the rear surface of the next adjacent plate whereby said plates are spaced from one another by broad bearing surfaces engaging the rear sides of each plate.

In testimony whereof, I affix my signature.

LEWIS D. HARNETT.